United States Patent
Liu

(10) Patent No.: US 12,484,064 B2
(45) Date of Patent: Nov. 25, 2025

(54) METHOD OF REPORTING USER EQUIPMENT CAPABILITY, EQUIPMENT, AND COMPUTER READABLE STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 566 days.

(21) Appl. No.: 17/920,141

(22) PCT Filed: Apr. 21, 2020

(86) PCT No.: PCT/CN2020/085991
§ 371 (c)(1),
(2) Date: Oct. 20, 2022

(87) PCT Pub. No.: WO2021/212341
PCT Pub. Date: Oct. 28, 2021

(65) Prior Publication Data
US 2023/0189271 A1 Jun. 15, 2023

(51) Int. Cl.
*H04W 72/21* (2023.01)
*H04W 72/51* (2023.01)
*H04W 76/10* (2018.01)

(52) U.S. Cl.
CPC .......... *H04W 72/21* (2023.01); *H04W 72/51* (2023.01); *H04W 76/10* (2018.02)

(58) Field of Classification Search
CPC ...... H04W 72/21; H04W 76/10; H04W 72/51
See application file for complete search history.

(56) References Cited

U.S. PATENT DOCUMENTS 9,167,416 B2  10/2015  Kim et al.
9,622,071 B2  4/2017  Kim et al.
(Continued)

FOREIGN PATENT DOCUMENTS

CN  103209403 A  7/2013
CN  103891173 A  6/2014
(Continued)

OTHER PUBLICATIONS

Chinese Office Action issued on Dec. 2, 2022 for Chinese Patent Application No. 2020800006961.
(Continued)

*Primary Examiner* — Myron Wyche
(74) *Attorney, Agent, or Firm* — Volpe Koenig

(57) ABSTRACT

A method of reporting a user equipment capability, a base station, and reduced-capability user equipment (UE) are provided. The method includes: determining, by reduced-capability user equipment, first user equipment (UE) capability information based on its own type, where the reduced-capability user equipment and enhanced mobile broadband user equipment (EMBBUE) coexist in a coexistence network; sending, by the reduced-capability user equipment, the determined first UE capability information to a base station; receiving, by the base station, the first UE capability information from the reduced-capability user equipment, and based on the first UE capability information, determining a UE capability corresponding to the reduced-capability user equipment.

20 Claims, 2 Drawing Sheets

(56) References Cited

U.S. PATENT DOCUMENTS

| | | |
|---|---|---|
| 9,628,983 B2 | 4/2017 | Kim et al. |
| 10,070,304 B2 | 9/2018 | Kim et al. |
| 10,575,166 B2 | 2/2020 | Kim et al. |
| 2013/0039232 A1 | 2/2013 | Kim et al. |
| 2015/0117400 A1 | 4/2015 | Gopal et al. |
| 2016/0029207 A1 | 1/2016 | Kim et al. |
| 2016/0029208 A1 | 1/2016 | Kim et al. |
| 2016/0029209 A1 | 1/2016 | Kim et al. |
| 2017/0150491 A1* | 5/2017 | Lin ............... H04W 76/14 |
| 2018/0092080 A1* | 3/2018 | Kim ............... H04L 5/0053 |
| 2018/0227904 A1 | 8/2018 | Raghunathan et al. |
| 2019/0007828 A1 | 1/2019 | Kim et al. |
| 2020/0344595 A1 | 10/2020 | Chen |
| 2022/0304014 A1* | 9/2022 | Li ............... H04L 5/0092 |

FOREIGN PATENT DOCUMENTS

| | | |
|---|---|---|
| CN | 104335633 A | 2/2015 |
| CN | 105915323 A | 8/2016 |
| CN | 110035426 A | 7/2019 |
| CN | 110226338 A | 9/2019 |
| EP | 2942986 A1 | 11/2015 |
| WO | 2017/027057 A1 | 2/2017 |

OTHER PUBLICATIONS

ISA Written Opinion issued on Dec. 9, 2022 for PCT International Application No. PCT/CN2020/085991.
ISA State Intellectual Property Office of the People's Republic of China, International Search Report Issued in Application No. PCT/CN2020/085991, Dec. 9, 2020, WIPO, 4 pages.

* cited by examiner

METHOD OF REPORTING USER EQUIPMENT CAPABILITY, EQUIPMENT, AND COMPUTER READABLE STORAGE MEDIUM

CROSS REFERENCE TO RELATED APPLICATIONS

The present application is a U.S. National Stage of International Application No. PCT/CN2020/085991 filed on Apr. 21, 2020, the contents of which are incorporated herein by reference in their entireties for all purposes.

TECHNICAL FIELD

The present disclosure relates to the field of communication technologies, and in particular to a method of reporting a user equipment capability, equipment, and a computer readable storage medium.

BACKGROUND

At present, the 3rd Generation Partnership Project (3GPP) carries out a project research on "Reduced capability NR devices (REDCAP) of Release 17 (R17)" with the aim of reducing the complexity of the user equipment (UE) in the case of coexistence with R15 terminals and R16 terminals, thus saving the costs.

However, this results in very high network requirements. After the complexity of the terminals is reduced, the requirements for system coverage and the system will be probably increased, and the radio resource utilization rate will be reduced. Therefore, it is required to propose a solution for reducing impact on network while reducing UE complexity.

SUMMARY

A method of reporting a user equipment capability, equipment, and a computer readable storage medium are provided, so as to reduce impact on network while reducing UE complexity. A solution is proposed below.

According to a first aspect, there is provided a method of reporting a user equipment capability, which is performed by a base station and includes:
receiving first user equipment (UE) capability information from reduced-capability user equipment, where the first UE capability information sent by the reduced-capability user equipment is determined by the reduced-capability user equipment based on a type of the reduced-capability user equipment, and the reduced-capability user equipment and enhanced mobile broadband user equipment (EMBBUE) coexist in a coexistence network; and
based on the first UE capability information, determining a UE capability corresponding to the reduced-capability user equipment.

In an example, the first UE capability information includes type information corresponding to the reduced-capability user equipment;
based on the first UE capability information, determining the UE capability corresponding to the reduced-capability user equipment includes:
based on the type information corresponding to the reduced-capability user equipment and a correspondence between the type of the reduced-capability user equipment and second UE capability information, determining the second UE capability information corresponding to the reduced-capability user equipment; and
based on the determined second UE capability information, determining the UE capability corresponding to the reduced-capability user equipment.

In an example, the method further includes:
configuring the correspondence between the type information corresponding to the reduced-capability user equipment and the second UE capability information.

In another example, the first UE capability information includes at least one item of the second UE capability information corresponding to the reduced-capability user equipment;
based on the first UE capability information, determining the UE capability corresponding to the reduced-capability user equipment includes:
based on the at least one item of the second UE capability information corresponding to the reduced-capability user equipment and a mapping relationship between various second UE capability information, determining third UE capability information corresponding to the reduced-capability user equipment; and
based on the at least one item of the second UE capability information corresponding to the reduced-capability user equipment and at least one item of the third UE capability information, determining the UE capability corresponding to the reduced-capability user equipment.

In another example, the first UE capability information includes fourth UE capability information corresponding to the reduced-capability user equipment;
based on the first UE capability information, determining the UE capability corresponding to the reduced-capability user equipment includes:
based on the fourth UE capability information corresponding to the reduced-capability user equipment, determining the UE capability corresponding to the reduced-capability user equipment.

In another example, the UE capability information comprises at least one item of:
supported bandwidth; mobility information; supported uplink and downlink information; latency information; coverage intensity information; control channel element (CCE) information; antenna information; or supported bit rate information.

According to a second aspect, there is provided a base station, including:
one or more processors;
a memory; and
one or more application programs, where the one or more application programs are stored in the memory and configured to be executed by the one or more processors to perform operations corresponding to the method of reporting a user equipment capability according to the above first aspect.

According to a third aspect, there is provided a method of reporting a user equipment capability, which is performed by reduced-capability user equipment and includes:
determining first user equipment (UE) capability information based on a type of the reduced-capability user equipment, wherein the reduced-capability user equipment and enhanced mobile broadband user equipment (EMBBUE) coexist in a coexistence network; and
sending the first UE capability information to a base station.

In an example, determining the first UE capability information based on the type of the reduced-capability user equipment includes at least one of:

based on preset information, determining the type of the reduced-capability user equipment, and based on the determined type, determining the first UE capability information; or based on a preset class, determining the first UE capability information;

the preset information includes at least one item of:

use case; supported bandwidth; mobility information; supported uplink and downlink information; latency information; coverage intensity information; control channel element (CCE) information; antenna information; or supported bit rate information.

In another example, determining the first UE capability information based on the type of the reduced-capability user equipment and sending the first UE capability information to the base station include:

when originating a radio resource control (RRC) connection request, determining the first UE capability information based on the type of the reduced-capability user equipment; and sending the RRC connection request to the base station, where the RRC connection request carries the first UE capability information.

In another example, the method further includes: receiving UE capability query request information from the base station.

In another example, the first UE capability information includes type information corresponding to the reduced-capability user equipment;

sending first UE capability information to the base station includes:

sending the type information corresponding to the reduced-capability user equipment to the base station.

In another example, determining the first UE capability information based on the type of the reduced-capability user equipment includes:

based on the type of the reduced-capability user equipment, determining second UE capability information corresponding to the type; and based on at least one item of the second UE capability information corresponding to the type, determining the first UE capability information.

In another example, the method further includes:

configuring a correspondence between the type information corresponding to the reduced-capability user equipment and the second UE capability information.

According to a fourth aspect, there is provided reduced-capability user equipment, including:

one or more processors;

a memory; and one or more application programs, where the one or more application programs are stored in the memory and configured to be executed by the one or more processors to perform operations corresponding to the method of reporting a user equipment capability according to the above third aspect.

The technical solutions provided by the present disclosure have the following beneficial effects.

A method of reporting a user equipment capability, reduced-capability user equipment and a computer readable storage medium are provided. Compared with the related arts, in the present disclosure, the reduced-capability user equipment determines the first UE capability information based on its own type, where the reduced-capability user equipment and enhanced mobile broadband user equipment (EMBBUE) coexist in a coexistence network; then, the reduced-capability user equipment sends the first UE capability information to the base station, such that the base station can perform resource configuration for the reduced-capability user equipment based on the reported UE capability information, without making other improvements on the system or network. Thus, impact on network can be reduced while reducing UE complexity.

A method of reporting a user equipment capability, a base station, and a computer readable storage medium are provided. Compared with the related arts, in the present disclosure, the base station receives the first UE capability information from the reduced-capability user equipment, where the first UE capability information sent by the reduced-capability user equipment is determined by the reduced-capability user equipment based on its own type, and the reduced-capability user equipment and enhanced mobile broadband user equipment (EMBBUE) coexist in a coexistence network; then, the base station, based on the first UE capability information, determines the UE capability corresponding to the reduced-capability user equipment, such that the base station can perform resource configuration for the reduced-capability user equipment based on the reported first UE capability information, without making other improvements on the system or network. Thus, impact on network can be reduced while reducing UE complexity.

BRIEF DESCRIPTION OF THE DRAWINGS

In order to more clearly describe the technical solutions of the embodiments of the present disclosure, the accompanying drawings required for the description of the embodiments of the present disclosure will be briefly introduced below.

DETAILED DESCRIPTION OF THE EMBODIMENTS

Figure 1:
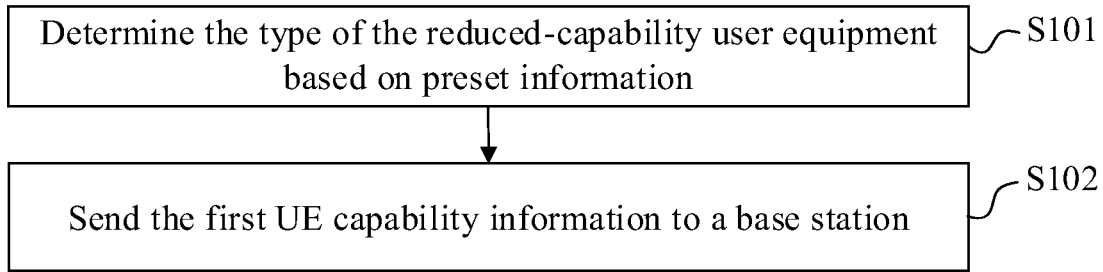
FIG. 1 is a flowchart illustrating a method of reporting a user equipment capability according to an embodiment of the present disclosure.
Figure 2:
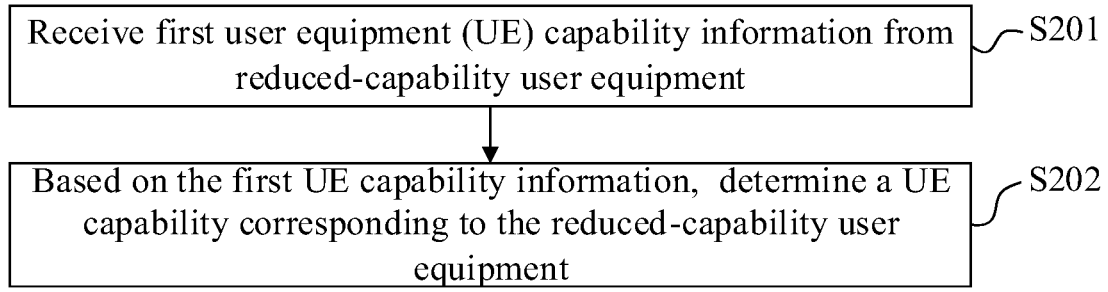
FIG. 2 is a flowchart illustrating another method of reporting a user equipment capability according to an embodiment of the present disclosure.

The embodiments of the present disclosure are described in detail below with their examples illustrated in the drawings, where the same or similar symbols represent the same or similar components or components with the same or similar functions throughout the specification. The embodiments described by referring to the accompanying drawings below are only illustrative and shall be used only to explain the present disclosure rather than limit the present disclosure.

Those skilled in the art should understand that the singular forms used herein, for example, "one," "a," "the," and "said," shall include the plural forms unless otherwise stated. It should be further understood that the term "include" used in the specification of the present disclosure refers to presence of the features, integers, steps, operations, components, and/or assemblies but does not preclude the presence or addition of one or more other features, integers, steps, operations, components, assemblies and/or combinations thereof. It should be understood that when we say a component is connected or coupled to another component, such component may be connected or coupled to another component directly or through an intermediate component. Furthermore, the terms "connect" and "couple" used herein may include wireless connection or wireless coupling. The term "and/or" used herein includes any or all units and all combinations of one or more associated listed items.

In order to make the objects, the technical solutions, and the advantages of the present disclosure clearer, the embodiments of the present disclosure will be further elaborated below in combination with the drawings.

The technical solutions of the present disclosure will be described below in detail by referring to the embodiments to show how the above technical problems are solved. The following specific embodiments may be mutually combined, and the same or similar concepts or processes may be omitted in some embodiments. The embodiments of the present disclosure are described below in combination with the accompanying drawings.

There is provided a method of reporting a user equipment capability, which is performed by the reduced-capability user equipment. As shown in FIG. 1, the method includes the following steps.

At step S101, first user equipment (UE) capability information is determined based on a type of the reduced-capability user equipment.

The reduced-capability user equipment and enhanced mobile broadband (EMBB/eMBB) user equipment (UE) coexist in a coexistence network.

In an example of the present disclosure, the reduced-capability user equipment may also be called Redcap UE.

In an example of the present disclosure, eMBB is used for heavy-traffic mobile broadband services, that is, the EMBUE is a terminal device running heavy-traffic mobile broadband services.

In an example of the present disclosure, the reduced-capability user equipment is applicable to service scenarios such as industrial wireless sensors, video surveillance, and wearable devices, with the main aim of reducing complexity, costs, and sizes compared with NR eMBB terminals. The potential approaches include: reduced antenna number, bandwidth, half-duplex, relaxed processing latency, reduced number of detections of Physical Downlink Control Channel (PDCCH), extended discontinuous reception (DRX), and relaxed Radio Resource Management (RRM) for terminals with fixed position.

In an example of the present disclosure, in step S101, when the reduced-capability user equipment and the EMBBUE coexist in a coexistence network, the reduced-capability user equipment determines the first UE capability information based on a type to which the reduced-capability user equipment currently belongs.

In an example of the present disclosure, the reduced-capability user equipment can be classified in the following manners:
the reduced-capability user equipment is classified based on at least one of the following classification manners:
use case; supported bandwidth; mobility information; supported uplink and downlink information; latency information; coverage intensity information; control channel element (CCE) information; antenna information; or supported bit rate information.

In an example of the present disclosure, the reduced-capability user equipment may be classified based on the use case to which the reduced-capability user equipment is applicable. For example, the use cases applicable to the reduced-capability user equipment include industrial wireless sensors, video surveillance, and wearable devices. Thus, the reduced-capability user equipment may be classified into three types based on the use cases to which the reduced-capability user equipment is applicable.

In another example of the present disclosure, the reduced-capability user equipment may also be classified based on the bandwidth supported by the reduced-capability user equipment. For example, the reduced-capability user equipment supports maximum bandwidths of 20 megabits per second (Mbps) and 40 Mbps, and thus can be classified into two types based on the supported maximum bandwidths, i.e., the reduced-capability user equipment supporting the maximum bandwidth of 20 Mbps and the reduced-capability user equipment supporting the maximum bandwidth of 40 Mbps.

In another example of the present disclosure, the reduced-capability user equipment may also be classified based on the mobility information supported by the reduced-capability user equipment. For example, the mobility information corresponding to the reduced-capability user equipment includes: stationary and mobility, and thus, the reduced-capability user equipment can be classified into two types based on the mobility information supported by the reduced-capability user equipment, that is, the reduced-capability user equipment supporting stationary and the reduced-capability user equipment supporting mobility.

In an example of the present disclosure, the reduced-capability user equipment can be classified based on at least one of the supported uplink and downlink information, latency information, coverage intensity information, CCE information, antenna information, or supported bit rate information as above, and thus their classifications will not be repeated herein.

Furthermore, in an example of the present disclosure, the reduced-capability user equipment may also be classified based on any combination thereof.

At step S102, the first UE capability information is sent to a base station.

In an example of the present disclosure, after determining the first UE capability information based on its own type, the reduced-capability user equipment reports the determined first UE capability information to the base station.

In the method of reporting a user equipment capability according to the embodiments of the present disclosure, compared with the related arts, in the embodiments of the present disclosure, the reduced-capability user equipment determines the first UE capability information based on its own type, where the reduced-capability user equipment and enhanced mobile broadband user equipment (EMBBUE) coexist in a coexistence network; then, the reduced-capability user equipment sends the first UE capability information to the base station, such that the base station can perform resource configuration for the reduced-capability user equipment based on the reported UE capability information, without making any other improvements on system or network. In this way, the impact on the network can be reduced while reducing UE complexity.

In an example of the present disclosure, the step S101 may include: step S1011 (not shown) and step S1012 (not shown).

At step S1011, the type of the reduced-capability user equipment is determined based on preset information.

The preset information includes at least one item of:
use case; supported bandwidth; mobility information; supported uplink and downlink information; latency information; coverage intensity information; control channel element (CCE) information; antenna information; or supported bit rate information.

In an example of the present disclosure, the use case represents a use scenario to which the reduced-capability user equipment is applied, for example, industrial wireless sensor, video surveillance and wearable device (also referred to as Wearables); the mobility information represents whether the reduced-capability user equipment is mobility or stationary; the supported uplink and downlink information represents whether the reduced-capability user equipment supports uplink transmission or downlink transmission; the latency information represents whether the reduced-capability user equipment supports high latency or low latency; CCE information represents a maximum value of the CCE supported by the reduced-capability user equipment and whether retransmission is supported; the antenna information represents antenna information corresponding to the reduced-capability user equipment, for example, 1T2R does not support alternating transmission and 1T2R w/SRS switching.

In an example of the present disclosure, the reduced-capability user equipment determines its own type in a manner corresponding to the specific classification manner of the reduced-capability user equipment.

In an example of the present disclosure, if the reduced-capability user equipment is classified based on the use case, the reduced-capability user equipment determines its own corresponding type based on the corresponding use case. For example, when the use case corresponding to the reduced-capability user equipment is an industrial wireless sensor case, it is determined that the reduced-capability user equipment belongs to the type corresponding to the industrial wireless sensor.

In another example of the present disclosure, if the reduced-capability user equipment is classified based on the bandwidth supported by the reduced-capability user equipment, the reduced-capability user equipment determines its corresponding type based on the supported bandwidth. For example, when the reduced-capability user equipment supports a maximum bandwidth of 20 Mbps, it is determined that the type corresponding to the reduced-capability user equipment is the type corresponding to the bandwidth 20 Mbps.

At step S1012, based on the determined type, the first UE capability information is determined.

In an example of the present disclosure, after determining its own type, the reduced-capability user equipment may use the determined type information as the first UE capability information reported to the base station; or use at least one item of the second UE capability information as the first UE capability information reported to the base station. In an example of the present disclosure, determining at least one item of the second UE capability information as the first UE capability information may include: determining a part of the second UE capability information as the first UE capability information reported to the base station, or determining all of the second UE capability information as the first UE capability information reported to the base station.

In another example of the present disclosure, the step S101 of determining, by the reduced-capability user equipment, the to-be-reported first UE capability information based on its own type includes: determining, by the reduced-capability user equipment, the first UE capability information based on a preset class.

In an example of the present disclosure, the reduced-capability user equipment is pre-classified, and the reduced-capability user equipment can determine the first UE capability information based on its own type. In an example of the present disclosure, the first UE capability information may be the type information corresponding to the reduced-capability user equipment or maybe the type information corresponding to the reduced-capability user equipment and the relationship between the type information and the second UE capability information. The second UE capability information corresponding to the reduced-capability user equipment is determined, and then at least one item of the second UE capability information is determined as the first UE capability information to be reported to the base station.

In another example of the present disclosure, the first UE capability information includes the type information corresponding to the reduced-capability user equipment; the step S102 may include: sending the type information corresponding to the reduced-capability user equipment to the base station.

For example, the reduced-capability user equipment is classified into three types based on use cases. For example, the reduced-capability user equipment is classified into three types 1-1, 1-2, and 1-3 based on the use cases of an industrial wireless sensor, video surveillance, and wearable device. If reduced-capability user equipment corresponds to the type 1-1, the type 1-1 is determined as the first UE capability information and then reported to the base station.

For another example, the reduced-capability user equipment may be classified into two types based on the supported bandwidths, for example, may be classified into two types denoted as 2-1 and 2-2 based on the supported bandwidths 20 Mbps and 40 Mbps. Thus, the service type corresponding to the current reduced-capability user equipment is a service type corresponding to the bandwidth 20 Mbps, which is denoted as 2-1. In this way, the 2-1 is determined as the first UE capability information and reported to the base station.

In another example of the present disclosure, the step S101 may include: based on the type of the reduced-capability user equipment, determining the second UE capability information corresponding to the type; based on at least one item of the second UE capability information corresponding to the type, determining the first UE capability information; the step S102 may include: sending at least one item of the second UE capability information corresponding to the type to the base station.

In an example of the present disclosure, after determining its own type, the reduced-capability user equipment may determine the corresponding second UE capability information and report at least one item of the second UE capability information as the first UE capability information to the base station.

The second UE capability information may include at least one item of:
supported bandwidth; mobility information; supported uplink and downlink information; latency information; coverage intensity information; control channel element (CCE) information; antenna information; or supported bit rate information.

In an example of the present disclosure, determining the first UE capability information based on at least one item of the second UE capability information may include: based on a part of the second UE capability information, determining the first UE capability information; or based on all of the second UE capability information, determining the first UE capability information.

The UE capability information includes at least one item of:

supported bandwidth; mobility information; supported uplink and downlink information; latency information; coverage intensity information; control channel element (CCE) information; antenna information; or supported bit rate information.

In an example of the present disclosure, the first UE capability information is determined based on a part of the second UE capability information and reported to the base station. For example, when the maximum bandwidth supported by the current reduced-capability user equipment is 20 Mbps, the bandwidth 20 Mbps is determined as the first UE capability information and reported to the base station.

In an example of the present disclosure, the reduced-capability user equipment may also determine or select the second UE capability information based on the type, which includes: determining the supported bandwidth 20 Mbps, coverage enhancement, stationary, and supported uplink and downlink transmission, etc., as the UE capability information to be reported to the base station.

In an example of the present disclosure, the second UE capability information may also be referred to as UE capability attribute information. The reduced-capability user equipment may determine the UE capability attribute information based on a type and determine the first UE capability information based on at least one item of the determined UE capability attribute information and report it to the base station. The reduced-capability user equipment may also determine the first UE capability information based on all of the determined UE capability attribute information and report it to the base station.

In the embodiments of the present disclosure, the reduced-capability user equipment may report its own type information to the base station or report at least one item of the second UE capability information determined based on the type information to the base station, or report all of the second UE capability information determined based on the type information to the base station, such that the base station performs more accurate resource allocation for the reduced-capability user equipment while having less impact on other UEs.

In the above embodiments, descriptions are made as to how the reduced-capability user equipment determines its own type and how the reduced-capability user equipment determines the first UE capability information. In the following embodiments, detailed descriptions will be made to possible use cases where the reduced-capability user equipment determines the first UE capability information and reports it to the base station (specific use cases where the reduced-capability user equipment is triggered to report the UE capability).

In another example of the present disclosure, the steps S101 and steps S102 may include: when originating a radio resource control (RRC) connection request, determining the first UE capability information based on the type of the reduced-capability user equipment; and sending the RRC connection request to the base station.

The RRC connection request carries the first UE capability information.

In an example of the present disclosure, the reduced-capability user equipment, when originating the RRC connection request, may determine the first UE capability information based on the manner as in the above embodiments and then carry the determined first UE capability information in the RRC connection request and send the RRC connection request to the base station, such that the base station can obtain the first UE capability information from the RRC connection request and perform resource configuration for the reduced-capability user equipment based on the obtained first UE capability information.

In another example of the present disclosure, before the step S101 is performed, the method further includes: receiving, by the reduced-capability user equipment, UE capability query request information from the base station.

In an example of the present disclosure, the base station may send the UE capability query request information to the reduced-capability user equipment, and the reduced-capability user equipment performs the steps S101 and S102 after receiving the UE capability query request information. The steps S101 and S102 are as shown in the above embodiments and will not be repeated herein.

In the above embodiments, the manner in which the UE capability information is reported is described from the perspective of the reduced-capability user equipment. The manner in which the UE capability information is reported will be described from the perspective of the base station, with details referred to the following embodiments.

There is provided a method of reporting a user equipment capability, which is performed by a base station and includes the following steps.

At step S201, first user equipment (UE) capability information is received from reduced-capability user equipment.

The first UE capability information sent by the reduced-capability user equipment is determined by the reduced-capability user equipment based on a type of the reduced-capability user equipment, and the reduced-capability user equipment and enhanced mobile broadband user equipment (EMBBUE) coexist in a coexistence network. In an example of the present disclosure, the reduced-capability user equipment may also be referred to as RedcapUE.

In an example of the present disclosure, the base station may obtain the first UE capability information from a radio resource control (RRC) connection request sent by the reduced-capability user equipment; or, when the base station needs the first UE capability information of the reduced-capability user equipment, the base station may send the UE capability query request information to the reduced-capability user equipment, and receive the first UE capability information returned by the reduced-capability user equipment based on the UE capability query request information.

At step S202, based on the first UE capability information, a UE capability corresponding to the reduced-capability user equipment is determined.

In an example of the present disclosure, the base station receives the UE capability information from the reduced-capability user equipment, determines the UE capability corresponding to the reduced-capability user equipment based on the UE capability information, and then performs resource configuration for the reduced-capability user equipment.

In an example of the present disclosure, after determining the UE capability corresponding to the reduced-capability user equipment based on the UE capability information, the base station performs resource configuration for the reduced-capability user equipment based on the determined UE capability corresponding to the reduced-capability user equipment and UE-fixed UE capability information.

In the method of reporting a user equipment capability according to the present disclosure, compared with the related arts, in the embodiments of the present disclosure, the base station receives the first UE capability information from the reduced-capability user equipment, where the first UE capability information sent by the reduced-capability user equipment is determined by the reduced-capability user equipment based on the type of the reduced-capability user equipment, and the reduced-capability user equipment and enhanced mobile broadband user equipment (EMBBUE) coexist in a coexistence network; then, the base station determines the UE capability corresponding to the capability-reduce user equipment based on the first UE capability information, such that the base station can perform resource configuration for the reduced-capability user equipment based on the reported first UE capability information, without making other improvements on the system or network. Thus, the impact on the network can be reduced while reducing UE complexity.

In an example of the present disclosure, the UE capability information includes type information corresponding to the reduced-capability user equipment; the step S202 may include: based on the type information corresponding to the reduced-capability user equipment and a correspondence between a type to which the reduced-capability user equipment belongs and second UE capability information, determining the second UE capability information corresponding to the reduced-capability user equipment; based on the determined second UE capability information, determining the UE capability corresponding to the reduced-capability user equipment.

In another example of the present disclosure, the method further includes: configuring the correspondence between the type information corresponding to the reduced-capability user equipment and the second UE capability information.

In an example of the present disclosure, configuration for the correspondence between the type information corresponding to the reduced-capability user equipment and the second UE capability information can be carried out before the UE capability corresponding to the reduced-capability user equipment is determined based on the type corresponding to the reduced-capability user equipment and the correspondence between each type and the second UE capability information.

In an example of the present disclosure, the UE capability information reported by the reduced-capability user equipment (the first UE capability information) includes: the type information corresponding to the reduced-capability user equipment. Because the correspondence between the type corresponding to the reduced-capability user equipment and the second UE capability information is configured in the base station, the base station, after receiving the type information corresponding to the reduced-capability user equipment, may determine the second UE capability information corresponding to the reduced-capability user equipment based on the type information corresponding to the reduced-capability user equipment, and determine the UE capability corresponding to the reduced-capability user equipment based on the second UE capability information corresponding to the reduced-capability user equipment.

In another example of the present disclosure, before determining the UE capability corresponding to the reduced-capability user equipment based on the type corresponding to the reduced-capability user equipment and the correspondence between each type and the second UE capability information, the method further includes: configuring the correspondence between the type information corresponding to the reduced-capability user equipment and the second UE capability information.

For example, the reduced-capability user equipment is classified into three types denoted as 1-1, 1-2 and 1-3 based on use cases, where the second UE capability information corresponding to the 1-1 includes supported bandwidth being 20 Mbps, mobility information being stationary or mobility, the maximum bit rate is 25 Mbps, low latency and uplink and downlink transmission being supported; the second UE capability information corresponding to the 1-2 includes: supported bandwidth being 20 Mbps, stationary or mobility, the maximum bit rate being 25 Mbps, low latency and uplink and downlink transmission being supported; the second UE capability information corresponding to the 1-3 includes: supported bandwidth being 40 Mbps, mobility, the maximum uplink bit rate being 50 Mbps, the maximum downlink bit rate being 150 Mbps, and uplink and downlink transmission is supported. It is assumed that the received type information corresponding to the reduced-capability user equipment is 1-1, where the second UE capability information corresponding to the 1-1 includes supported bandwidth being 20 Mbps, mobility information being stationary or mobility, the maximum bit rate being 25 Mbps, low latency, and uplink and downlink transmission is supported. In this case, the second UE capability information corresponding to the 1-1 and the UE-fixed UE capability attribute information are determined as the UE capability corresponding to the reduced-capability user equipment.

In another example of the present disclosure, the second UE capability information includes at least one item of: supported bandwidth; mobility information; supported uplink and downlink information; latency information; coverage intensity information; control channel element (CCE) information; antenna information; or supported bit rate information.

In another example of the present disclosure, the first UE capability information includes at least one item of the second UE capability information corresponding to the reduced-capability user equipment; the step S202 may include: based on at least one item of the second UE capability information corresponding to the reduced-capability user equipment and a mapping relationship between various second UE capability information, determining third UE capability information corresponding to the reduced-capability user equipment; based on at least one item of the second UE capability information corresponding to the reduced-capability user equipment and at least one item of the third UE capability information, determining the UE capability corresponding to the reduced-capability user equipment.

In an example of the present disclosure, if the UE capability information received by the base station from the reduced-capability user equipment includes at least one item of the second UE capability information corresponding to the reduced-capability user equipment, the base station determines another second UE capability information corresponding to the reduced-capability user equipment (the third UE capability information) based on the received at least one item of the second UE capability information and the mapping relationship between various second UE capability information. In an example of the present disclosure, the mapping relationship between various second UE capability information is pre-configured for the base station.

For example, the first UE capability information received by the base station from the reduced-capability user equipment includes: bandwidth information supported by the reduced-capability user equipment, bandwidth information supported based on the reduced-capability user equipment, and mapping relationship between various second UE capability information. In this case, the base station determines another second UE capability information (the third UE capability information) and determines the received bandwidth information supported by the reduced-capability user equipment and the another second UE capability information (the third UE capability information) as the UE capability corresponding to the reduced-capability user equipment.

In an example of the present disclosure, when performing resource configuration based on the UE capability, the base station needs to perform resource configuration based on both the UE capability corresponding to the reduced-capability user equipment and a fixed UE capability (the fixed UE capability refers to a same UE capability corresponding to each UE).

In another example of the present disclosure, the first UE capability information includes: fourth UE capability information corresponding to the reduced-capability user equipment; the step S202 may include: based on the fourth UE capability information corresponding to the reduced-capability user equipment, determining the UE capability corresponding to the reduced-capability user equipment.

In an example of the present disclosure, the fourth UE capability information includes: all second UE capability information determined by the reduced-capability user equipment, or all second UE capability information selected by the reduced-capability user equipment.

In an example of the present disclosure, if the base station receives the fourth UE capability information reported by the reduced-capability user equipment, the base station determines the fourth UE capability information reported by the reduced-capability user equipment as the UE capability corresponding to the reduced-capability user equipment. In an example of the present disclosure, the base station performs resource configuration for the reduced-capability user equipment based on the determined UE capability corresponding to the reduced-capability user equipment and the fixed UE capability.

For example, the fourth UE capability information received by the base station from the reduced-capability user equipment includes: the supported bandwidth being 20 Mbps, the mobility information being stationary or mobility, the maximum bit rate being 25 Mbps, low latency, and the uplink and downlink transmissions being supported, the number of antennas being 1T2R not supporting alternating transmission. The above attribute information is determined as the UE capability.

In the embodiments of the present disclosure, the base station may, based on the type information reported by the reduced-capability user equipment, determine the second UE capability information corresponding to the type so as to determine the UE capability of the reduced-capability user equipment. The base station may also, based on at least one item of the second UE capability information reported by the reduced-capability user equipment, determine another UE capability information (the third UE capability information) so as to determine the UE capability corresponding to the reduced-capability user equipment. The base station may also, based on all of the second UE capability information reported by the reduced-capability user equipment (the fourth UE capability information), determine the UE capability corresponding to the reduced-capability user equipment. In this way, the base station may perform more accurate resource allocation for the reduced-capability user equipment based on the UE capability reported by the reduced-capability user equipment, while having less impact on other UEs.

For example, for the UEs with low mobility, the network may directionally relax mobility measurement for the UEs, and the other attributes follow this way, and thus no redundant descriptions will be made herein.

In the above embodiments, descriptions are made of the method of reporting a user equipment capability from the perspective of the method flow. In the following embodiments, descriptions will be made below of a base station and reduced-capability user equipment from the perspective of virtual modules. The base station is configured to perform the above embodiments implemented by the base station, and the reduced-capability user equipment is configured to perform the above embodiments implemented by the reduced-capability user equipment. The detailed descriptions are made below.

Figure 3:
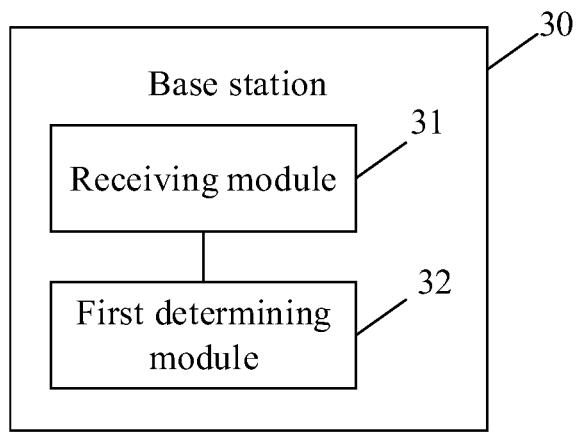
FIG. 3 is a structural schematic diagram illustrating a base station according to an embodiment of the present disclosure.

There is provided a base station. As shown in FIG. 3, the base station 30 may include a receiving module 31 and a first determining module 32.

The receiving module 31 is configured to receive first user equipment (UE) capability information from reduced-capability user equipment.

The first UE capability information sent by the reduced-capability user equipment is determined by the reduced-capability user equipment based on a type of the reduced-capability user equipment, and the reduced-capability user equipment and enhanced mobile broadband user equipment (EMBBUE) coexist in a coexistence network.

The first determining module 32 is configured to, based on the first UE capability information, determine a UE capability corresponding to the reduced-capability user equipment.

In an example of the present disclosure, the first UE capability information includes type information corresponding to the reduced-capability user equipment.

When determining the UE capability corresponding to the reduced-capability user equipment based on the first UE capability information, the first determining module 32 is configured to:
based on the type information corresponding to the reduced-capability user equipment and a correspondence between the type of the reduced-capability user equipment and second UE capability information, determine the second UE capability information corresponding to the reduced-capability user equipment; and
based on the determined second UE capability information, determine the UE capability corresponding to the reduced-capability user equipment.

In an example of the present disclosure, the base station 30 further includes a first configuring module, where,
the first configuring module is configured to configure the correspondence between the type information corresponding to the reduced-capability user equipment and the second UE capability information.

In an example of the present disclosure, the first UE capability information includes: at least one item of the second UE capability information corresponding to the reduced-capability user equipment.

When determining the UE capability corresponding to the reduced-capability user equipment based on the first UE capability information, the first determining module 32 is configured to:
based on at least one item of the second UE capability information corresponding to the reduced-capability user equipment and a mapping relationship between various second UE capability information, determine third UE capability information corresponding to the reduced-capability user equipment; and based on at least one item of the second UE capability information corresponding to the reduced-capability user equipment and at least one item of the third UE capability information, determine the UE capability corresponding to the reduced-capability user equipment.

In an example of the present disclosure, the first UE capability information includes fourth UE capability information corresponding to the reduced-capability user equipment;

when determining the UE capability corresponding to the reduced-capability user equipment based on the first UE capability information, the first determining module 32 is configured to:

based on the fourth UE capability information corresponding to the reduced-capability user equipment, determine the UE capability corresponding to the reduced-capability user equipment.

In an example of the present disclosure, the UE capability information includes at least one item of:

supported bandwidth; mobility information; supported uplink and downlink information;

latency information; coverage intensity information; control channel element (CCE) information; antenna information; or supported bit rate information.

In the base station provided by the embodiments of the present disclosure, compared with the related arts, in the embodiments of the present disclosure, the base station receives the UE capability information from the reduced-capability user equipment (RedcapUE), where the UE capability information sent by the RedcapUE is determined by the RedcapUE based on its own type under a coexistence network and the coexistence network is a network where the RedcapUE and enhanced mobile broadband user equipment (EMBBUE) coexist. Then, based on the UE capability information, the base station determines the UE capability corresponding to RedcapUE. That is, in a case of coexistence of the RedcapUE and the EMBBUE, the base station receives the UE capability information determined by the RedcapUE, i.e., the UE with lower complexity, based on the type of the RedcapUE, and determines the UE capability corresponding to the RedcapUE. Thus, the base station can perform resource configuration for the RedcapUE based on the reported UE capability information, without making other improvements on system or network. In this way, the impact on the network can be reduced while reducing UE complexity.

The base station in this embodiment can perform the method of reporting a user equipment capability, implemented by the base station as shown in the above embodiments. Its implementation principle is similar to that of the method and will not be repeated herein.

Figure 4:
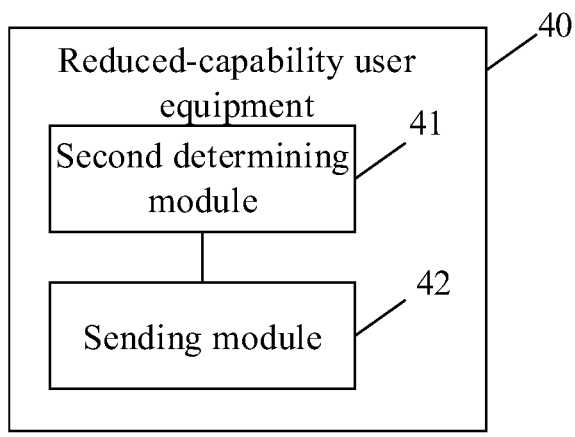
FIG. 4 is a structural schematic diagram illustrating reduced-capability user equipment according to an embodiment of the present disclosure.

There is provided reduced-capability user equipment. As shown in FIG. 4, the reduced-capability user equipment 40 may include a second determining module 41 and a sending module 42.

The second determining module 41 is configured to determine to-be-reported first user equipment (UE) capability information based on a type of the reduced-capability user equipment.

The reduced-capability user equipment and enhanced mobile broadband user equipment (EMBBUE) coexist in a coexistence network.

The sending module 42 is configured to send the first UE capability information to a base station.

In an example of the present disclosure, when determining the first UE capability information based on its own type, the second determining module 41 is configured to perform at least one of:

based on preset information, determining the type of the reduced-capability user equipment, and based on the determined type, determining the first UE capability information; or based on a preset class, determining the first UE capability information, the preset information includes at least one item of:

use case; supported bandwidth; mobility information; supported uplink and downlink information; latency information; coverage intensity information; control channel element (CCE) information; antenna information; or supported bit rate information.

In an example of the present disclosure, when determining the first UE capability information based on its own type, the second determining module 41 is configured to:

when originating a radio resource control (RRC) connection request, determine the first UE capability information based on the type of the reduced-capability user equipment;

when sending the determined UE capability information to the base station, the sending module 42 is configured to:

send the RRC connection request to the base station, where the RRC connection request carries the first UE capability information.

In an example of the present disclosure, the reduced-capability user equipment 40 further includes a receiving module, where, the receiving module is configured to receive UE capability query request information from the base station.

In an example of the present disclosure, the first UE capability information includes type information corresponding to the reduced-capability user equipment;

when sending the first UE capability information to the base station, the sending module 42 is configured to:

send the type information corresponding to the reduced-capability user equipment to the base station.

In an example of the present disclosure, when determining the first UE capability information based on a type of the reduced-capability user equipment, the second determining module 41 is configured to:

based on the type, determine second UE capability information corresponding to the type; and determine at least one item of the second UE capability information corresponding to the type as the first UE capability information.

In an example of the present disclosure, the reduced-capability user equipment 40 further includes a second configuring module, where, the second configuring module is configured to configure a correspondence between the type information corresponding to the reduced-capability user equipment and the second UE capability information.

In the reduced-capability user equipment provided by the embodiments of the present disclosure, compared with the related arts, in the present disclosure, the reduced-capability user equipment determines the first UE capability information based on its own type, where the reduced-capability user equipment and enhanced mobile broadband user equipment (EMBBUE) coexist in a coexistence network; then, the reduced-capability user equipment sends the first UE capability information to the base station, such that the base station can perform resource configuration for the reduced-capability user equipment based on the reported UE capability information, without making other improvements on system or network. In this way, the impact on the network is reduced while reducing UE complexity.

The reduced-capability user equipment in this embodiment can perform the method of reporting a user equipment capability implemented by the reduced-capability user equipment as shown in the above embodiments. Its implementation principle is similar to that of the method and thus will not be repeated herein.

In the above embodiments, descriptions are made to the method of reporting a user equipment capability from the perspective of the method flow, as well as to the base station and the reduced-capability user equipment from the perspective of virtual modules. In the following embodiments, descriptions will be made to a base station and a RedcapUE from the perspective of the entity apparatus. The base station is configured to perform the above embodiments implemented by the base station, and the RedcapUE is configured to perform the above embodiments implemented by the RedcapUE. The detailed descriptions are made below.

Figure 5:
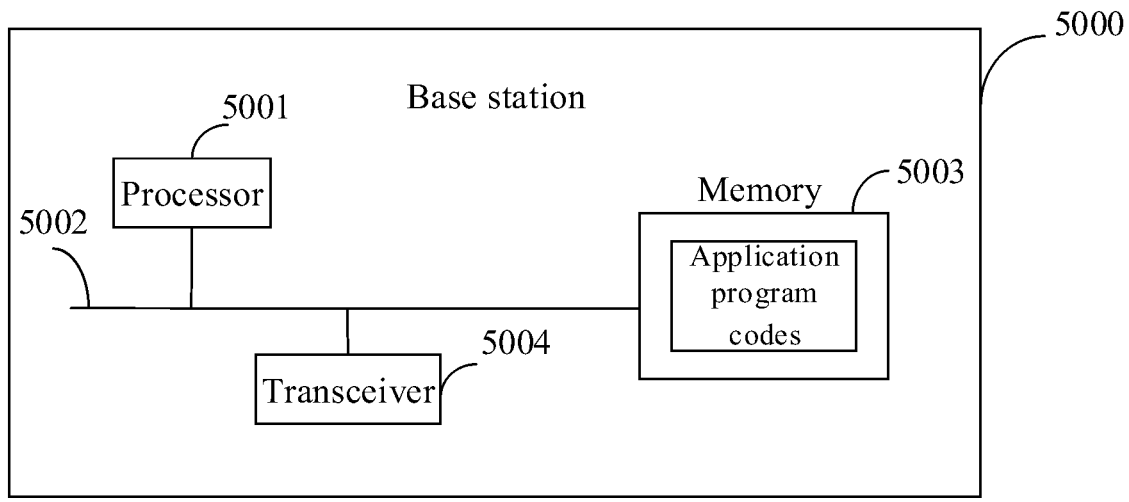
FIG. 5 is another structural schematic diagram illustrating a base station according to an embodiment of the present disclosure.

There is provided a base station. As shown in FIG. 5, it shows a base station 5000, including a processor 5001 and a memory 5003. The processor 5001 and the memory 5003 are connected, for example, by a bus 5002. In some examples, the base station 5000 may also include a transceiver 5004. It should be noted that the number of the transceivers 5004 is not limited to one in actual applications. The structure of the base station 5000 does not constitute any limitation to the embodiments of the present disclosure.

The processor 5001 may be a Central Processing Unit (CPU), general processor, DSP, ASIC, FPGA, or another programmable logic device, transistor logic device, hardware part, or any combination thereof. It can implement or perform various logic blocks, modules, and circuits described in combination with the contents disclosed herein. The processor 5001 may also be a combination implementing a computing function, for example, a combination including one or more microprocessors, a combination of DSP and microprocessor, or the like.

The bus 5002 may include a passage conveying information between various components. The bus 5002 may be a PCI bus, or EISA bus, or the like. The bus 5002 may include an address bus, a data bus, a control bus, etc. For ease of illustration, there is only one thick line shown in FIG. 5, which does not indicate there is only one bus or one type of bus.

The memory 5003 may be a read-only memory (ROM) or another type of static storage device capable of storing static information and instructions, or a Random Access Memory (RAM), or another type of dynamic storage device capable of storing information and instructions, or Electrically-Erasable Programmable Read-Only Memory (EEPROM), CD-ROM, or other compact disk storages, optical disk storages (including compression optical disk, laser optical disk, optical disk, digital versatile disk and blue light optical disk and the like), magnetic disk storage media or other magnetic storage devices, or any other media capable of carrying or storing desired program codes in the form of instruction or data structure and being accessed by a computer and the like.

The memory 5003 is configured to store application program codes for performing the solutions of the present disclosure under the control of the processor 5001. The processor 5001 is configured to execute the application program codes stored in the memory 5003 to implement the contents shown in any of the previous method embodiments the base station implements.

There is provided a base station. The base station in the embodiments of the present disclosure includes: a memory and a processor. At least one program is stored in the memory for execution by the processor. Compared with the related arts, the followings can be implemented: in the embodiments of the present disclosure, the base station receives the UE capability information from the reduced-capability user equipment (RedcapUE), where the UE capability information sent by the RedcapUE is determined by the RedcapUE based on its own type under a coexistence network, and the coexistence network is a network where the RedcapUE and enhanced mobile broadband user equipment (EMBBUE) coexist. Then, based on the UE capability information, the base station determines the UE capability corresponding to RedcapUE. That is, in a case of coexistence of the RedcapUE and the EMBBUE, the base station receives the UE capability information determined by the RedcapUE, i.e., the UE with lower complexity, based on the type of the RedcapUE, and determines the UE capability corresponding to the RedcapUE. Thus, the base station can perform resource configuration for the RedcapUE based on the reported UE capability information, without making other improvements on system or network. In this way, the impact on the network can be reduced while reducing UE complexity.

There is provided a computer-readable storage medium storing a computer program. When the computer program is run on a computer, the computer is caused to perform the corresponding contents in the method embodiments. Compared with the related arts, in the embodiments of the present disclosure, the base station receives the UE capability information from the reduced-capability user equipment (RedcapUE), where the UE capability information sent by the RedcapUE is determined by the RedcapUE based on its own type under a coexistence network, and the coexistence network is a network where the RedcapUE and enhanced mobile broadband user equipment (EMBBUE) coexist. Then, based on the UE capability information, the base station determines the UE capability corresponding to RedcapUE. That is, in a case of coexistence of the RedcapUE and the EMBBUE, the base station receives the UE capability information determined by the RedcapUE, i.e., the UE with lower complexity, based on the type of the RedcapUE, and determines the UE capability corresponding to the RedcapUE. Thus, the base station can perform resource configuration for the RedcapUE based on the reported UE capability information, without making other improvements on system or network. In this way, the impact on the network can be reduced while reducing UE complexity.

Figure 6:
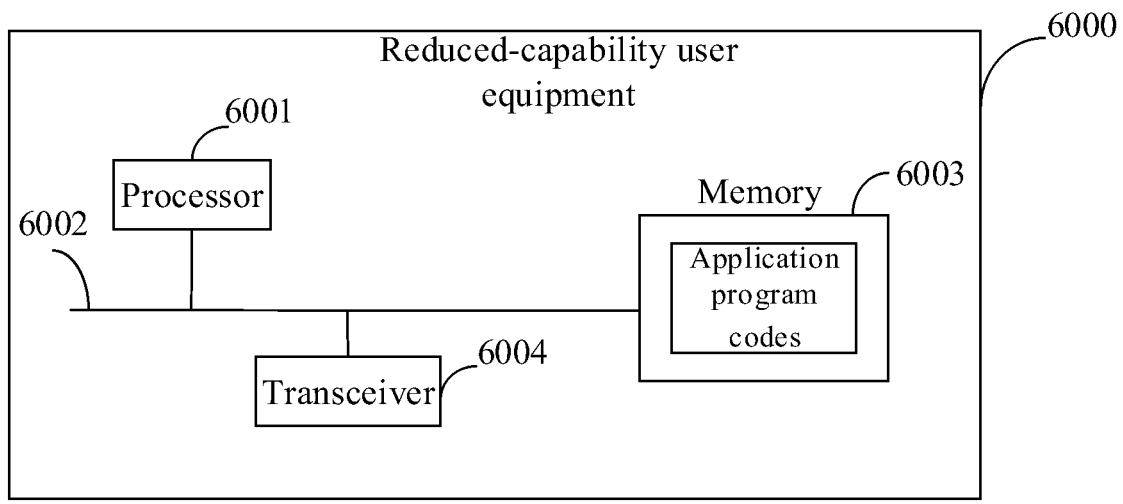
FIG. 6 is another structural schematic diagram illustrating reduced-capability user equipment according to an embodiment of the present disclosure.

Reduced-capability user equipment (RedcapUE) is provided. FIG. 6 shows a RedcapUE 6000 including a processor 6001 and a memory 6003. The processor 6001 and the memory 6003 are connected, for example, by a bus 6002. In some examples, the RedcapUE 6000 may also include a transceiver 6004. It should be noted that the number of the transceivers 6004 is not limited to one in actual applications. The structure of the RedcapUE 6000 does not constitute any limitation to the embodiments of the present disclosure.

The processor 6001 may be a Central Processing Unit (CPU), general processor, DSP, ASIC, FPGA, or another programmable logic device, transistor logic device, hardware part, or any combination thereof. It can implement or perform various logic blocks, modules, and circuits described in combination with the contents disclosed herein. The processor 6001 may also be a combination implementing a computing function, for example, a combination including one or more microprocessors, a combination of DSP and microprocessor, or the like.

The bus 6002 may include a passage conveying information between various components. The bus 6002 may be a PCI bus, or EISA bus, or the like. The bus 6002 may include an address bus, a data bus, a control bus, etc. For ease of illustration, there is only one thick line shown in FIG. 6, which does not indicate there is only one bus or one type of bus.

The memory 6003 may be a read-only memory (ROM) or another type of static storage device capable of storing static information and instructions, a Random Access Memory (RAM), or another type of dynamic storage device capable of storing information and instructions, or Electrically-Erasable Programmable Read-Only Memory (EEPROM), CD-ROM, or other compact disk storages, optical disk storages (including compression optical disk, laser optical disk, optical disk, digital versatile disk and blue light optical disk and the like), magnetic disk storage media or other magnetic storage devices, or any other media capable of carrying or storing desired program codes in the form of instruction or data structure and being accessed by a computer and the like.

The memory 6003 is configured to store application program codes for performing the solutions of the present disclosure under the control of the processor 6001. The processor 6001 is configured to execute the application program codes stored in the memory 6003 to implement the contents shown in any of the previous method embodiments, the reduced-capability user equipment implements.

There is provided reduced-capability user equipment. The reduced-capability user equipment in the embodiments of the present disclosure includes: a memory and a processor. At least one program is stored in the memory for execution by the processor. Compared with the related arts, the followings can be implemented: in the embodiments of the present disclosure, the reduced-capability user equipment determines the first UE capability information based on its own type, where the reduced-capability user equipment and enhanced mobile broadband user equipment (EMBBUE) coexist in a coexistence network; then, the reduced-capability user equipment sends the first UE capability information to the base station, such that the base station can perform resource configuration for the reduced-capability user equipment based on the reported UE capability information, without making other improvements on system or network. In this way, the impact on the network can be reduced while reducing UE complexity.

There is provided a computer-readable storage medium storing a computer program. When the computer program is run on a computer, the computer is caused to perform the corresponding contents in the method embodiments. Compared with the related arts, in the embodiments of the present disclosure, the reduced-capability user equipment determines the first UE capability information based on its own type, where the reduced-capability user equipment and enhanced mobile broadband user equipment (EMBBUE) coexist in a coexistence network; then, the reduced-capability user equipment sends the first UE capability information to the base station, such that the base station can perform resource configuration for the reduced-capability user equipment based on the reported UE capability information, without making other improvements on system or network. In this way, the impact on the network can be reduced while reducing UE complexity.

It should be understood that although various steps in the flowchart of the accompanying drawings are displayed in a sequence indicated by an arrow, these steps are not necessarily performed in the sequence indicated by the arrow. Unless otherwise clearly stated in the present disclosure, these steps are not limited to any strict sequence and may be performed in another sequence. Furthermore, at least part of the steps in the flowchart of the accompanying drawings may include a plurality of sub-steps or a plurality of stages. These sub-steps or stages are not necessarily completed at the same moment, but may be performed at different moments. These sub-steps or stages are also not necessarily performed in sequence but may be performed in turns or alternately with at least part of other steps or the sub-steps or stages of other steps.

The above descriptions are made merely to some embodiments of the present disclosure. It should be pointed out that those skilled in the art may also make several improvements and modifications without departing from the principle of the present disclosure, and these improvements and modifications shall all fall within the scope of protection of the present disclosure.

The invention claimed is:

1. A method of reporting a user equipment (UE) capability, being performed by a base station and comprising:
receiving first user equipment (UE) capability information from reduced-capability user equipment, wherein the first UE capability information sent by the reduced-capability user equipment is determined by the reduced-capability user equipment based on a type of the reduced-capability user equipment, and the reduced-capability user equipment and enhanced mobile broadband user equipment (EMBBUE) coexist in a coexistence network,
wherein the type is determined by the reduced-capability user equipment in a manner corresponding to a classification manner of the reduced-capability user equipment; and
based on the first UE capability information, determining a UE capability corresponding to the reduced-capability user equipment.

2. The method of claim 1, wherein the first UE capability information comprises type information corresponding to the reduced-capability user equipment; and
the determining of the UE capability corresponding to the reduced-capability user equipment comprises:
based on the type information corresponding to the reduced-capability user equipment and a correspondence between the type of the reduced-capability user equipment and second UE capability information, determining the second UE capability information corresponding to the reduced-capability user equipment; and
based on the determined second UE capability information corresponding to the reduced-capability user equipment, determining the UE capability corresponding to the reduced-capability user equipment.

3. The method of claim 2, further comprising:
configuring the correspondence between the type information corresponding to the reduced-capability user equipment and the second UE capability information.

4. The method of claim 1, wherein the first UE capability information comprises at least one item of second UE capability information corresponding to the reduced-capability user equipment; and
the determining of the UE capability corresponding to the reduced-capability user equipment comprises:
based on the at least one item of the second UE capability information corresponding to the reduced-capability user equipment and a mapping relationship between various second UE capability information, determining third UE capability information corresponding to the reduced-capability user equipment; and
based on the at least one item of the second UE capability information corresponding to the reduced-capability user equipment and at least one item of the third UE capability information, determining the UE capability corresponding to the reduced-capability user equipment.

5. The method of claim 1, wherein the first UE capability information comprises fourth UE capability information corresponding to the reduced-capability user equipment; and
the determining of the UE capability corresponding to the reduced-capability user equipment comprises:
based on the fourth UE capability information corresponding to the reduced-capability user equipment, determining the UE capability corresponding to the reduced-capability user equipment.

6. The method of claim 2, UE capability information comprises at least one item of:
supported bandwidth;
mobility information;
supported uplink and downlink information;
latency information;
coverage intensity information;
control channel element (CCE) information;
antenna information; or
supported bit rate information.

7. A method of reporting a user equipment (UE) capability, being performed by reduced-capability user equipment and comprising:
determining first user equipment (UE) capability information based on a type of the reduced-capability user equipment, wherein the reduced-capability user equipment and enhanced mobile broadband user equipment (EMBBUE) coexist in a coexistence network,
wherein the type is determined by the reduced-capability user equipment in a manner corresponding to a classification manner of the reduced-capability user equipment; and
sending the first UE capability information to a base station.

8. The method of claim 7, wherein determining the first UE capability information based on the type of the reduced-capability user equipment comprises at least one of:
based on preset information, determining the type of the reduced-capability user equipment, and based on the determined type, determining the first UE capability information; or
based on a preset class, determining the first UE capability information;
the preset information comprises at least one item of:
use case;
supported bandwidth;
mobility information;
supported uplink and downlink information;
latency information;
coverage intensity information;
control channel element (CCE) information;
antenna information; or
supported bit rate information.

9. The method of claim 7, wherein determining the first UE capability information based on the type of the reduced-capability user equipment and sending the first UE capability information to the base station comprise:
when originating a radio resource control (RRC) connection request, determining the first UE capability information based on the type of the reduced-capability user equipment; and
sending the RRC connection request to the base station, wherein the RRC connection request carries the first UE capability information.

10. The method of claim 7, further comprising:
receiving UE capability query request information from the base station.

11. The method of claim 7, wherein the first UE capability information comprises type information corresponding to the reduced-capability user equipment; and
the sending of the first UE capability information to the base station comprises:
sending the type information corresponding to the reduced-capability user equipment to the base station.

12. The method of claim 7, wherein determining the first UE capability information based on the type of the reduced-capability user equipment comprises:
based on the type of the reduced-capability user equipment, determining second UE capability information corresponding to the type; and
based on at least one item of the second UE capability information corresponding to the type, determining the first UE capability information.

13. The method of claim 12, further comprising:
configuring a correspondence between type information corresponding to the reduced-capability user equipment and the second UE capability information.

14. A base station, comprising:
one or more processors;
a memory; and
one or more application programs, wherein the one or more application programs are stored in the memory and configured to be executed by the one or more processors to perform the method of reporting a user equipment capability according to claim 1.

15. Reduced-capability user equipment (UE), comprising:
one or more processors;
a memory; and
one or more application programs, wherein the one or more application programs are stored in the memory and configured to be executed by the one or more processors to perform following operations comprising:
determining first user equipment (UE) capability information based on a type of the reduced-capability user equipment, wherein the reduced-capability user equipment and enhanced mobile broadband user equipment (EMBBUE) coexist in a coexistence network,
wherein the type is determined by the reduced-capability user equipment in a manner corresponding to a classification manner of the reduced-capability user equipment; and
sending the first UE capability information to a base station.

16. The reduced-capability user equipment of claim 15, wherein when determining the first UE capability information based on the type of the reduced-capability user equipment, the one or more application programs are configured to be executed by the one or more processors to perform at least one of:
based on preset information, determining the type of the reduced-capability user equipment, and based on the determined type, determining the first UE capability information; or based on a preset class, determining the first UE capability information;
the preset information comprises at least one item of:
use case;
supported bandwidth;
mobility information;
supported uplink and downlink information;
latency information;
coverage intensity information;
control channel element (CCE) information;
antenna information; or
supported bit rate information.

17. The reduced-capability user equipment of claim 15, wherein when determining the first UE capability information based on the type of the reduced-capability user equipment and sending the first UE capability information to the base station, the one or more application programs are configured to be executed by the one or more processors to perform following operations comprising:
   when originating a radio resource control (RRC) connection request, determining the first UE capability information based on the type of the reduced-capability user equipment; and
   sending the RRC connection request to the base station, wherein the RRC connection request carries the first UE capability information.

18. The reduced-capability user equipment of claim 15, wherein the one or more application programs are further configured to be executed by the one or more processors to perform following operation comprising:
   receiving UE capability query request information from the base station.

19. The reduced-capability user equipment of claim 15, wherein the first UE capability information comprises type information corresponding to the reduced-capability user equipment;
   when sending the first UE capability information to the base station, the one or more application programs are configured to be executed by the one or more processors to perform following operation comprising:
   sending the type information corresponding to the reduced-capability user equipment to the base station.

20. The reduced-capability user equipment of claim 15, wherein when determining the first UE capability information based on the type of the reduced-capability user equipment, the one or more application programs are configured to be executed by the one or more processors to perform following operation comprising:
   based on the type of the reduced-capability user equipment, determining second UE capability information corresponding to the type; and
   based on at least one item of the second UE capability information corresponding to the type, determining the first UE capability information.

* * * * *